United States Patent
Chen et al.

(10) Patent No.: US 6,998,461 B2
(45) Date of Patent: Feb. 14, 2006

(54) MODIFIED POLYESTER FIBER AND PROCESS FOR PRODUCING THE SAME

(75) Inventors: Shien Chang Chen, Taipei (TW); June Yen Chou, Kaohsiung (TW); Hsing Yun Wang, Kaohsiung (TW); Nan Min Chen, Kaohsiung (TW)

(73) Assignee: Dairen Chemical Corporation, Taipei (TW)

( * ) Notice: Subject to any disclaimer, the term of this patent is extended or adjusted under 35 U.S.C. 154(b) by 162 days.

(21) Appl. No.: 10/459,752

(22) Filed: Jun. 12, 2003

(65) Prior Publication Data

US 2004/0204560 A1 Oct. 14, 2004

(30) Foreign Application Priority Data

Mar. 14, 2003 (TW) .......................................... 92105568

(51) Int. Cl.
*C08G 63/02* (2006.01)

(52) U.S. Cl. ........................ 528/272; 428/364; 428/365; 428/373; 428/395; 528/271
(58) Field of Classification Search ................. 428/364, 428/365, 373, 395; 528/271, 272
See application file for complete search history.

(56) References Cited

U.S. PATENT DOCUMENTS

| 5,916,677 A | 6/1999 | Chen et al. |
| 6,187,900 B1 | 2/2001 | Tseng et al. |

FOREIGN PATENT DOCUMENTS

EP 0984086 * 3/2000

* cited by examiner

*Primary Examiner*—Terressa Boykin
(74) *Attorney, Agent, or Firm*—Fulbright & Jaworski LLP

(57) ABSTRACT

Disclosed are a modified polyester fiber and a process for producing the same. The modified polyester fiber comprises the component of alkoxylated 2-methyl-1,3-propanediol and has the properties of easy dyeability at low temperatures and good colorfastness to laundering. The modified polyester fiber can be produced by undergoing a polymerization reaction of alkoxylated 2-methyl-1,3-propanediol, alkanediol, and terephthalic acid or an alkyl ester thereof, and then spinning. The modified polyester fiber can be dyed at low temperature and has excellent dyeability and colorfastness to laundering. Therefore, this modified polyester fiber can be widely used in the application of synthetic fiber product.

7 Claims, No Drawings

MODIFIED POLYESTER FIBER AND PROCESS FOR PRODUCING THE SAME

FIELD OF THE INVENTION

The present invention relates to a modified polyester fiber and a process for producing the same. More particularly, the present invention relates to an alkoxylated 2-methyl-1,3-propanediol modified polyethylene terephthalate fiber.

BACKGROUND OF THE INVENTION

Polyester fibers can be applied in clothing, decoration, and the like because of the advantages of their good abrasion resistance and low cost. Polyester fibers are of great importance in the application of synthetic fiber products. There are many varieties of polyester fibers, in which polyalkylene terephthalate formed by reacting terephthalic acid or its alkyl ester with alkanediol is widely used in many applications. The well-known polyalkylene terephthalate fibers include polyethylene terephthalate fibers (PET), polypropylene terephthalate fibers (PPT), and polybutylene terephthalate (PBT) fibers. Among them, polyethylene terephthalate fibers have about twice the strength as cotton and about four times the strength as wool, have elastic properties close to wool, and have excellent abrasion, crease, and heat resistance, as well as thermal stability. Consequently, PET fibers have become the most widely used synthetic fibers.

Polyethylene terephthalate fibers can be blended with other natural fibers such as wool and cotton to produce textile fibers with enhanced strength and durability. These combined fibers retain not only the physical properties of the polyesters, but also the desired qualities of the natural fibers. In general, when producing such a synthetic fiber, the formed polyester is extruded and drawn into linear filaments, and then stranded, curled, and chemically treated to obtain synthetic fibers having better properties than natural fibers such as wool and cotton.

In many applications, it is desirable that the textile fabric be available in a variety of colors, these colors being obtained by dyeing. However, unimproved polyethylene terephthalate fibers are not as stainable as most natural fibers, and must be dyed under the special conditions of high temperature, high pressure or both, or at normal atmospheric conditions using a dye carrier. Establishing these special conditions increases production costs as well as the investment in facilities. Furthermore, natural fibers such as wool, cotton, and spandex are thermally sensitive fibers, is which can cause problems when polyethylene terephthalate fibers are blended with these thermally sensitive fibers and dyed. As a result, the use of polyethylene terephthalate fibers is typically limited to specific applications, otherwise manufacturing complexity and costs increase in order to achieve the requirements of blending and dyeing.

In addition, there exist many disadvantages when fiber dyeability is improved by the physical and chemical reaction of dye carriers with the polyester fibers. Many dye carriers have functional groups that can chemically react with dye molecules and polyester fibers. These functional groups include carboxylic acids (particularly dicarboxylic or other multifunctional acids), organometallic sulfate or sulfonate compounds and the like. Reactive dyes can replace the disperse dyes in the above dyeing process, but this substitution can cause an increase in the production costs. Furthermore, these dye carriers will remain in the waste water and textile fabric after being processed, which poses risks to the environment.

In order to improve the dyeability of polyethylene terephthalate fibers, researchers have developed modified polyethylene terephthalate fibers to broaden the application fields of polyethylene terephthalate fibers without generating environmental pollution. U.S. Pat. No. 5,916,677 discloses 2-methyl-1,3-propanediol modified polyethylene terephthalate fibers having improved dyeability, elongation and fiber strength. However, the modified polyester fibers disclosed in that patent show poor colorfastness to laundering, can be easily dyed, and the dye therein can be easily washed out at the same time. As a result, these modified polyester fibers are also restricted to limited uses. U.S. Pat. No. 6,187,900 discloses a polyester fiber with easy dyeability at low temperatures, wherein the polyester fiber contains polypropylene terephthalate/polyethylene terephthalate (PPT/PET) copolyester. Although the formed polyester fiber of easy dyeability at low temperatures disclosed by that patent can decrease dyeing costs, the raw material "1,3-propanediol" for producing polypropylene terephthalate is not easily prepared. Consequently, 1,3-propanediol is in short supply and the price is high, which makes it difficult to reduce the total cost of production. Therefore, a modified polyester fiber is still needed that can undergo dyeing at low temperatures without increasing production costs.

SUMMARY OF THE INVENTION

It is an objective of this invention to provide a modified polyester fiber of easy dyeability at low temperatures.

It is another objective of this invention to provide an alkoxylated 2-methyl-1,3-propanediol modified polyethylene terephthalate fiber.

It is yet another objective of this invention to provide a modified polyethylene terephthalate fiber that can be dyed at a temperature of 100° C. under normal pressure without using a dye carrier.

It is a further objective of this invention to provide a modified polyethylene terephthalate fiber that has excellent dyeability and shows good colorfastness to laundering.

It is a further objective of this invention to provide a modified polyethylene terephthalate fiber that has the same level of colorfastness to laundering and easy dyeability at low temperatures as unmodified polypropylene terephthalate.

To achieve the above objectives, the present invention provides an alkoxylated 2-methyl-1,3-propanediol modified polyester fiber, more specifically a modified polyethylene terephthalate fiber, and a process for producing the same. The process for producing the modified polyester fiber of the invention comprises the steps of undergoing a polymerization reaction of alkoxylated 2-methyl-1,3-propanediol, terephthalic acid or an alkyl ester thereof, and alkanediol to form a polyester copolymer, and then subjecting the resultant polyester copolymer to a spinning process to produce a modified polyester fiber. The modified polyethylene terephthalate fiber of the present invention can be dyed at low temperatures under normal pressure without using a dye carrier. The modified polyethylene terephthalate fiber of the present invention is especially suitable to be blended with thermally sensitive natural fibers or spandex and dyed. Furthermore, the modified polyethylene terephthalate fiber of the present invention has excellent dyeability and shows good colorfastness to laundering after dyeing at low temperatures, and has the advantages of low cost, simplified processing, minimal environmental pollution, and the like.

DETAILED DESCRIPTION OF THE INVENTION

After intensive study, the inventors have found that, since alkoxylated 2-methyl-1,3-propanediol has a side chain of a methyl group which renders the polyester an asymmetric chemical structure, if this compound is used as one of the components of polyester polymers, dye molecules will attach to it readily. Moreover, when such an alkoxylated 2-methyl-1,3-propanediol is incorporated into the polyethylene terephthalate fiber to be modified, the modified polyethylene terephthalate fiber can be dyed at a temperature of 100° C. under normal pressure without using a dye carrier, and has excellent dyeability and shows good colorfastness to laundering.

Generally, the term polyester fiber refers to a fiber with more than 85 wt % of ester linkage containing linear polymer fiber prepared by undergoing a polycondensation reaction of diols or polyols with diacids or polyacids. Usually, terephthalic acid, or an alkyl ester thereof can undergo polymerization reaction with various alkanediols to form a polyalkylene terephthalate fiber. Examples of alkanediols include, but are not limited to, ethylene glycol, propanediol, and butanediol. Among them, terephthalic acid can react with ethylene glycol to form polyethylene terephthalate, with propanediol to form polypropylene terephthalate, or with butanediol to form polybutylene terephthalate. For the more widely used polyethylene terephthalate fiber, the fiber can be produced by undergoing a polymerization reaction of terephthalic acid or an alkyl ester thereof with ethylene glycol to form a polyester polymer, and then spinning.

In one embodiment of the present invention, the modified polyethylene terephthalate fiber can be produced by mixing alkoxylated 2-methyl-1,3-propanediol with ethylene glycol to form mixed glycols, then undergoing a polymerization reaction of the mixed glycols with terephthalic acid or an alkyl ester thereof to form a polyethylene terephthalate polymer, and finally spinning.

In the present invention, the preferred alkoxylated 2-methyl-1,3 propanediol for modification has the structure represented by the formula (I):

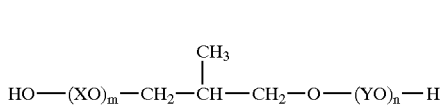

(1)

wherein each of X and Y is one group independently selected from the group consisting of a linear and a branched alkylene group having 2 to 4 carbon atoms, and m and n are independent integers from 0 to 6, where at least one of m and n is not equal to zero.

Examples of alkoxylated 2-methyl-1,3-propanediol include, but are not limited to, ethoxylated 2-methyl-1,3-propanediol, propoxylated 2-methyl-1,3-propanediol, isopropoxylated 2-methyl-1,3-propanediol, butoxylated 2-methyl-1,3-propanediol, isobutoxylated 2-methyl-1,3-propanediol, sec-butoxylated 2-methyl-1,3-propanediol, tert-butoxylated 2-methyl-1,3-propanediol, multialkoxylated 2-methyl-1,3-propanediol and the like. Among them, diethoxylated 2-methyl-1,3-propanediol and dipropoxylated 2-methyl-1,3-propanediol are preferred.

In the mixed glycols used to undergo a polymerization reaction with terephthalic acid or an alkyl ester thereof to form a polyester polymer, the amount of alkoxylated 2-methyl-1,3-propanediol employed is 1 to 15 mole %, and preferably 2 to 8 mole % based on the total amount of the mixed glycols. The mixed glycols composed of alkoxylated 2-methyl-1,3-propanediol and ethylene glycol can be used to undergo a polymerization reaction including direct esterification steps and polycondensation steps with terephthalic acid, or undergo a polymerization reaction including transesterification steps or polycondensation steps with terephthalate (such as dimethyl terephthalate) to form polyester polymer. Among them, the transesterification steps for the polymerization reaction can be conducted under mild conditions, and the requirements for the raw materials and the facilities are not high, and thus the transesterification steps for the polymerization reaction have the advantages of easy control and operation. However, when the transesterification steps are conducted, the terephthalate will be formed first, and thus the reaction steps for the polymerization reaction are increased. Moreover, when the direct esterification steps for the polymerization reaction are conducted, the requirements for the raw materials, the facilities, and the operation-control are high. However, the direct esterification steps for the polymerization reaction have the advantages of simplified reaction steps, less consumption of raw materials, and a higher quality product, so that processing using the direct esterification steps has become the mainstream of the manufacturing method at present.

According to a preferred embodiment of the present invention, the modified polyethylene terephthalate fiber can be produced according to the following steps. First, a mixture comprised of mixed glycols and terephthalic acid with a molar ratio of 1.5:1 to 1:1, and more preferably 1:1, was prepared. Then, the mixture was subjected to direct esterification under a pressure of 1 kg/cm² (G) at a temperature of 200 to 280° C., and preferably 250° C. at a conversion rate of 95% or more to obtain a low polymerized oligomer. Subsequently, a catalyst and optional additives (such as titanium oxide as a delustrant) are added to the obtained oligomer, and polycondensation was effected to form the polyester polymer of polyethylene terephthalate. Examples of the catalyst include, but are not limited to, antimony compound (such as antimony trioxide), germanium compound, titanium compound and the like. Generally, the polycondensation was conducted under a reduced pressure of 1 torr and at a temperature of 200 to 300° C., and preferably 280° C. The resulting polyesters after polymerization preferably have an intrinsic viscosity of 0.4 to 1.5 dl/g (measured at 30° C., in a mixed solvent of phenol/tetrachloroethane with a ratio of 40/60 by weight). If the intrinsic viscosity is less than 0.4 dl/g, the fiber strength of the resulting filament will be too weak to achieve the requirements of the application. On the other hand, if the intrinsic viscosity exceeds 1.5 dl/g, the molten viscosity will become too high and the spinnability, drawability, and dyeability of the fiber will decrease.

The above polymerization process comprising steps of esterification and condensation can be performed by either a batch process or a continuous process. The related reaction conditions for esterification and condensation are adjusted depending on the chosen reactants and the reaction system by those skilled in the art, and are not limited to the above.

Subsequently, the obtained polyester polymer was spun into polyester filaments. The conventional spinning processes include molten, dry, and wet spinning processes. For the polyethylene terephthalate fiber, the spinning for forming polyethylene terephthalate fiber can be performed by a conventional molten spinning process using polyethylene terephthalate as a spinning material. The molten spinning process comprises the following steps. After the polyesters are heated to turn into viscous liquid, these molten spinning materials are forced through a spinneret head and cured to form individual filaments. The obtained filaments are drawn under conventional drawing conditions. For example, the filaments are preheated while they are passed through hot rolls and they are hot drawn at an appropriate draw rate. Then, the modified polyethylene terephthalate fibers are obtained. However, in the related field of textile manufacturing, especially the manufacture of synthetic fibers, "spinning" means the manufacture of fibers from a polymer melt, or the twisting together of natural, synthetic, or blended fibers to form spun yarn.

The following examples are intended to illustrate the process and the advantages of the present invention more fully.

EXAMPLE

Example 1

The mixed glycols were obtained by mixing ethylene glycol and diethoxylated 2-methyl-1,3-propanediol with a molar ratio of 93:7. A mixture comprised of mixed glycols and terephthalic acid with a molar ratio of 1.2:1 was subjected to esterification under a pressure of 1 kg/cm² (G) and at a temperature of 250° C. at a conversion rate of 95% to obtain a low polymerized oligomer. Antimony trioxide in a concentration of 350 ppm was added to the obtained oligomer as a catalyst, and polycondensation was effected under a reduced pressure of 1 torr and at 280° C. for 3 hours to yield a polyester polymer having an intrinsic viscosity of 0.6 dl/g.

The obtained polyester polymer was extruded, and then cut into cylindrical polyester chips. The polyester chips thus obtained were dried, melted in an extruder, and then extruded through a spinneret of 20 holes, where the holes had a diameter of 0.25 mm, and the extruded filaments were taken up at a speed of 3,200 m/min. The obtained polyester yarn was drawn through a hot roll at 80° C. and a hot plate at 130° C. at a speed of 500 m/min to give multifilament yarns of 75 denier/40 filaments. The draw ratio was 1.7. Subsequently, these drawn filaments were knitted into hoselegs, and dyed at 100° C. as Sample 1. For comparison, following the same procedure as above, the unmodified polyethylene terephthalate fibers were knitted into hoselegs, and dyed at 130° C. as a Standard. The dyeability of the Standard was set to 100%. The colorfastness to laundering was tested according to AATCC test method 61 2A. The dyeability and the colorfastness to laundering of the Standard and Sample 1 were recorded and the results are listed in Table 1.

TABLE 1

| | Standard | | | Sample 1 | | |
| --- | --- | --- | --- | --- | --- | --- |
| | Dianix Blue | Dianix Rubine | Dianix Red | Dianix Blue | Dianix Rubine | Dianix Red |
| dyeability | 100% | 100% | 100% | 132.72% | 117.20% | 102.48% |
| color change | 4.5 grade | 4.5 grade | 4.5 grade | 4.5 grade | 4.5 grade | 4.5 grade |

Example 2

According to the same procedure as in Example 1, mixed glycols were obtained by mixing ethylene glycol and diethoxylated 2-methyl-1,3-propanediol with a molar ratio of 95:5. A mixture comprised of mixed glycols and terephthalic acid with a molar ratio of 1.2:1 was subjected to the processes of polymerization and spinning. The obtained drawn filaments were knitted into hoselegs and dyed at 100° C. as in Sample 2. For comparison, following the same procedure described above, drawn filaments made from the unmodified polyethylene terephthalate were knitted into hoselegs, and dyed at 130° C. as a Standard. The dyeability of the Standard was set to 100%. The colorfastness to laundering was tested according to AATCC test method 61 2A. The dyeability and the colorfastness to laundering of the Standard and Sample 2 were recorded and the results are listed in Table 2.

TABLE 2

| | Standard | | | Sample 2 | | |
| --- | --- | --- | --- | --- | --- | --- |
| | Dianix Blue | Dianix Rubine | Dianix Red | Dianix Blue | Dianix Rubine | Dianix Red |
| dyeability | 100% | 100% | 100% | 137.50% | 122.50% | 111.22% |
| color change | 4.5 grade | 4.5 grade | 4.5 grade | 4.5 grade | 4.5 grade | 4.5 grade |

Example 3

Following the same procedure as in Example 1, mixed glycols were obtained by mixing ethylene glycol and dipropoxylated 2-methyl-1,3-propanediol with a molar ratio of 93:7. A mixture comprised of mixed glycols and terephthalic acid with a molar ratio of 1.2:1 was subjected to the processes of polymerization and spinning. The obtained drawn filaments were knitted into hoselegs, and dyed at 100° C. as in Sample 3. For comparison, following the same procedure described above, the drawn filaments made from the unmodified polyethylene terephthalate were knitted into hoselegs, and dyed at 130° C. as a Standard. The dyeability of the Standard was set to 100%. The colorfastness to laundering was tested according to AATCC test method 61 2A. The dyeability and the colorfastness to laundering of the Standard and Sample 3 were recorded and the results are listed in Table 3.

TABLE 3

| | Standard | | | Sample 3 | | |
|---|---|---|---|---|---|---|
| | Dianix Blue | Dianix Rubine | Dianix Red | Dianix Blue | Dianix Rubine | Dianix Red |
| dyeability | 100% | 100% | 100% | 135.73% | 120.30% | 105.22% |
| color change | 4.5 grade | 4.5 grade | 4.5 grade | 4.5 grade | 4.5 grade | 4.5 grade |

Comparative Example 1

Following the same procedure as in Example 1, mixed glycols were obtained by mixing ethylene glycol and 2-methyl-1,3-propanediol with a To molar ratio of 95:5. A mixture comprised of mixed glycols and terephthalic acid with a molar ratio of 1.2:1 was subjected to the processes of polymerization and spinning. The obtained drawn filaments were knitted into hoselegs, and dyed at 100° C. as in Comparative Sample 4. For comparison, following the same procedure described above, the drawn filaments made from the unmodified polyethylene terephthalate were knitted into hoselegs, and dyed at 130° C. as a Standard. The dyeability of the Standard was set to 100%. The colorfastness to laundering was tested according to AATCC test method 61 2A. The dyeability and the colorfastness to laundering of the Standard and Comparative sample 4 were recorded and the results are listed in Table 4.

TABLE 4

| | Standard | | | Comparative Sample 4 | | |
|---|---|---|---|---|---|---|
| | Dianix Blue | Dianix Rubine | Dianix Red | Dianix Blue | Dianix Rubine | Dianix Red |
| dyeability | 100% | 100% | 100% | 119.50% | 110.70% | 101.34% |
| color change | 4.5 grade | 4.5 grade | 4.5 grade | 2 grade | 2 grade | 2.5 grade |

Comparative Example 2

Following the same procedure as in Example 1, a mixture comprised of 1,3-propylene glycol and terephthalic acid with a molar ratio of 1.2:1 was subjected to the processes of polymerization and spinning. The obtained drawn filaments were knitted into hoselegs and dyed at 100° C. as in comparative Sample 5. The tested dyeability and the colorfastness to laundering of comparative Sample 5, and the Standard and Sample 1 in EXAMPLE 1 were recorded and the results are listed in Table 5.

TABLE 5

| | Standard Dianix Blue | Comparative Sample 5 Dianix Blue | Sample 1 Dianix Blue |
|---|---|---|---|
| dyeability | 100% | 130% | 132.72% |
| color change | 4.5 grade | 4.5 grade | 4.5 grade |

It can be seen from the above results that an alkoxylated 2-methyl-1,3-propanediol modified polyethylene terephthalate fiber can be dyed at 100° C. and has the same dyeability and colorfastness to laundering as those of unmodified polypropylene terephthalate fiber, and thus can be used in a wide range of industrial applications.

The foregoing description of the preferred embodiments of this invention has been presented for purposes of illustration and description. It will be apparent to those skilled in the art that various modifications and variations can be made in the present invention without departing from the spirit or scope of the invention. Thus, it is intended that the present invention covers the modifications and variations of this invention provided they come within the scope of the appended claims.

What is claimed is:

1. A modified polyester fiber, which is produced by undergoing a polymerization reaction of alkoxylated 2-methyl-1,3-propanediol, alkanediol, and terephthalic acid or an alkyl ester thereof, wherein the alkoxylated 2-methyl-1,3-propanediol has the structure represented by the formula (I):

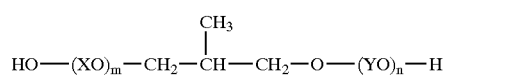

(1)

wherein each of X and Y is one group independently selected from the group consisting of a linear and a branched alkylene groups having 2 to 4 carbon atoms, and m and n are independent integers from 0 to 6, where at least one of m and n is not equal to zero.

2. The modified polyester fiber according to claim 1, wherein the amount of alkoxylated 2 methyl-1,3-propanediol employed is 1 to 15 mole % based on the total amount of the alkoxylated 2-methyl-1,3-propanediol and alkanediol.

3. The modified polyester fiber according to claim 2, wherein the amount of alkoxylated 2-methyl-1,3-propanediol employed is 2 to 8 mole % based on the total amount of the alkoxylated 2-methyl-1,3-propanediol and alkanediol.

4. A process for producing modified polyester fibers, comprising the following steps:
  (a) undergoing a polymerization reaction of alkoxylated 2 methyl-1,3-propanediol, terephthalic acid or an alkyl ester thereof, and an alkanediol to form a polyester copolymer, wherein the alkoxylated 2-methyl-1,3- propanediol has the structure represented by the formula (I):

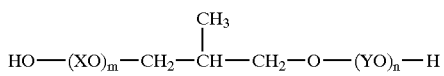

(1)

wherein each of X and Y is one group independently selected from the group consisting of a linear and a branched alkylene groups having 2 to 4 carbon atoms, and m and n are independent integers from 0 to 6, where at least one of m and n is not equal to zero; and (b) subjecting the polyester copolymer to a spinning process to produce a modified polyester fiber.

5. The process according to claim 4, wherein the alkanediol is ethylene glycol.

6. The process according to claim 5, wherein the amount of alkoxylated 2-methyl-1,3-propanediol employed is 1 to 15 mole %, based on the total amount of the alkoxylated 2-methyl-1,3-propanediol and ethylene glycol.

7. The process according to claim 6, wherein the amount of alkoxylated 2-methyl-1,3-propanediol employed is 2 to 8 mole %, based on the total amount of the alkoxylated 2-methyl-1,3-propanediol and ethylene glycol.

* * * * *